(12) United States Patent
Reiber

(10) Patent No.: US 7,775,799 B2
(45) Date of Patent: Aug. 17, 2010

(54) GLARE REDUCTION DEMONSTRATOR

(76) Inventor: Pascal Reiber, 7 chemin du rocher, Marcoussis (FR) 91460

( * ) Notice: Subject to any disclaimer, the term of this patent is extended or adjusted under 35 U.S.C. 154(b) by 936 days.

(21) Appl. No.: 11/604,106

(22) Filed: Nov. 24, 2006

(65) Prior Publication Data

US 2008/0124699 A1   May 29, 2008

(51) Int. Cl.
*G09B 23/22* (2006.01)
(52) U.S. Cl. .................... 434/303; 434/365
(58) Field of Classification Search ........... 434/276, 434/300, 303, 365, 367, 371, 402; 446/219; 359/493, 601, 602, 604
See application file for complete search history.

(56) References Cited

U.S. PATENT DOCUMENTS

| | | | | |
|---|---|---|---|---|
| 4,138,083 A | * | 2/1979 | Spiegel | 248/474 |
| 4,500,169 A | * | 2/1985 | Donnelly | 359/871 |
| 4,721,216 A | | 1/1988 | Kinder | |
| 4,898,560 A | * | 2/1990 | Moscovich | 446/85 |
| 5,080,940 A | * | 1/1992 | Kugimiya | 428/29 |
| 5,124,858 A | * | 6/1992 | Goetz | 359/872 |
| 5,149,032 A | | 9/1992 | Jones et al. | |
| 5,169,114 A | | 12/1992 | O'Neill | |
| 6,124,971 A | * | 9/2000 | Ouderkirk et al. | 359/487 |
| D456,635 S | | 5/2002 | Porsbo et al. | |
| 6,382,982 B1 | * | 5/2002 | Wilcox et al. | 434/303 |
| 6,808,394 B1 | | 10/2004 | Bentley | |
| 6,976,678 B1 | * | 12/2005 | Setteducati | 273/153 R |
| 7,040,583 B1 | | 5/2006 | Holland et al. | |
| 7,621,750 B1 | * | 11/2009 | Boinard et al. | 434/365 |

* cited by examiner

*Primary Examiner*—Kurt Fernstrom
(74) *Attorney, Agent, or Firm*—Gene Scott; Patent Law & Venture Group

(57) ABSTRACT

A glare reducing lens is demonstrated by a holder with a half-mirrored plate and a graphic image mounted on the holder at an angle to the plate. The plate has another graphic image positioned behind it and visible through the plate. The holder is adapted for movement on the base over a range of positions for convenient viewing by tall and short persons. Such positioning of the holder is controlled by mechanical interconnecting surfaces. The viewer sees the graphic image transmitted through the mirrored plate as well as a superimposed image reflected onto the mirrored plate from the separate graphic image. When a viewer does not use a glare reducing lens, the two images visually interfere with each other, while by viewing through a lens the reflected image is eliminated leaving the directly viewed graphic image sharp and clear.

17 Claims, 3 Drawing Sheets

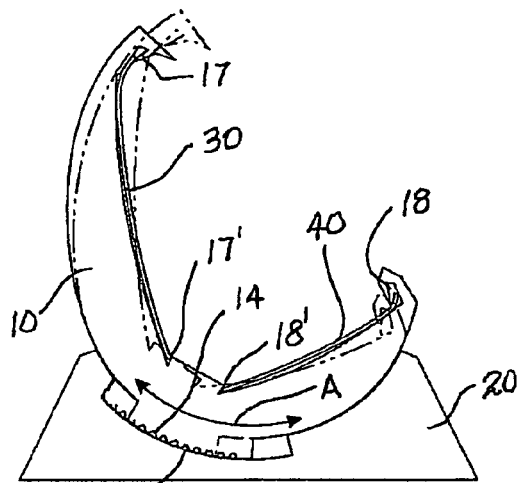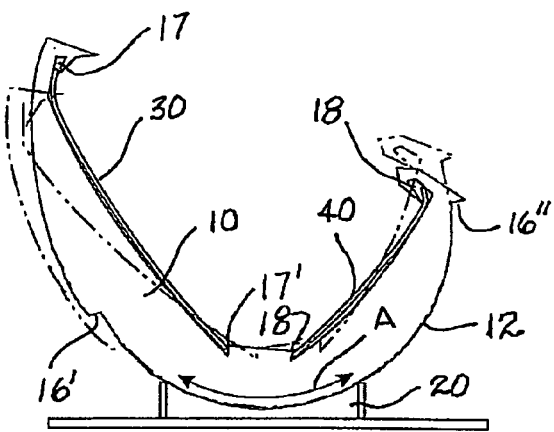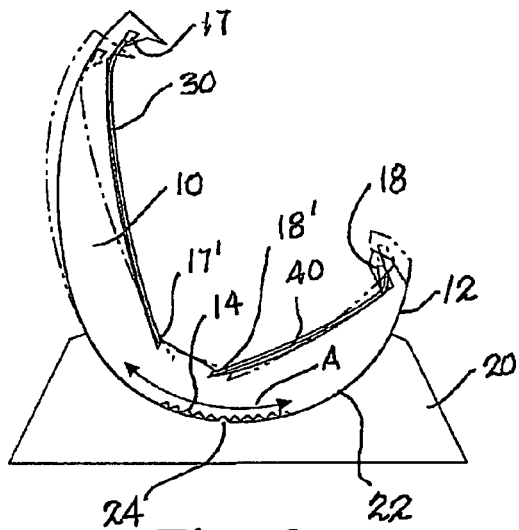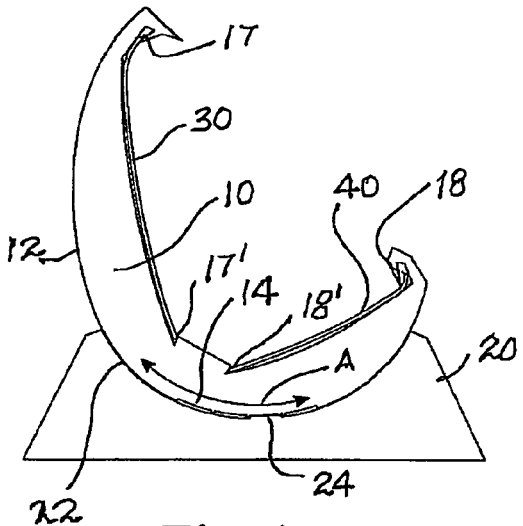

GLARE REDUCTION DEMONSTRATOR

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to optical demonstration devices, apparatuses, and equipments, and more particularly to a demonstration stand for showing the benefits of polarized lenses to prospective customers interested in purchasing sunglasses.

2. Description of Related Art including information disclosed under 37 CFR 1.97 and 1.98

Bentley, U.S. Pat. No. 6,808,394, discloses a system for demonstrating the effects of a polarized lens on reducing glare. The system includes a multi-layered light reflecting substrate having a visual indicia layer and a film layer which partially reflects single-axis polarized light and which partially transmits randomly polarized light. The film layer is disposed adjacent the visual indicia layer. The system also includes a polarized lens between the multi-layered light reflecting substrate and a viewer of the visual indicia. Included in the invention is a method of demonstrating the effects of a polarized lens on reducing glare in accordance with the system of the invention.

Porsbo, et al., U.S. D456,635, discloses an ornamental design for a demonstration and exhibition stand for a window product and marketing materials.

Holland et al, U.S. Pat. No. 7,040,583, discloses a stand for supporting display items of a flat plane type in a vertical position, and of the type having a ground engaging flat base plate a fixed vertical support member with a flat planar surface and an adjustable vertical support member which is L-shaped, has a flat planar surface and has a guide slot in its base portion, and is of sufficient height to prevent tipping of the display item. The guide slot is placed over a fixed guide pin and a fixed threaded guide pin in the base plate, allowing the adjustable vertical support member to be slidably moved in relationship to the fixed vertical support member such that a variable aperture is created between the two vertical supports, allowing flat display items of varying thickness to be placed between those supports. By tightening an adjustment knob down onto the threaded guide pin, the adjustable vertical support member may be temporarily fixed in position, trapping and securely holding the display item in a vertical position between the supports.

O'Neal, U.S. Pat. No. 5,169,114, discloses a supporting and security device for mounting an appliance on a support surface, or for hanging an appliance from a wall or ceiling. The device includes a base having upper and lower portions, and pads that adhere the sides of the appliance. Generally L-shaped side brackets are adjustably connected to the base by use of threaded fastener means. The appliance is placed on the base and clamped between the side brackets. The side brackets include a generally vertical portion for retaining the pads, and a generally horizontal portion for sliding within the base assembly.

Jones, et al., U.S. Pat. No. 5,149,032, discloses a universal cup holder for use in vehicles comprising a base having a pair of fixed upright arms an adjustable unit shiftably carried by the base, the adjustable unit including a pair of upright arms which are shiftable toward and away from the fixed arms whereby to permit the creation of a cup receiving area of differing sizes within the confines of the arms with open spaces being between all of the arms for receiving the handle, if present, on the container positioned within the cup receiving area. Incremental shifting of the unit is permitted by a ratcheting pawl assembly which, once the cup receiving area has been defined may be locked by means to retain the area in its desired dimension.

Kinder, U.S. Pat. No. 4,721,216, discloses a holder for a container for drinks and the like characterized by an arcuate first end adapted to fit the intercrural region and terminating in a second squared-off end; having a sloping bottom and; being adapted to sit between the legs of a person in the seat of a car for facilitating setting a drink container into a holder and retrieving the drink container from the holder for drinking safely even if the person is driving the vehicle. The holder has a receptacle and is formed of an insulating material. Preferably, the receptacle has an upper portion that is larger in diameter than a bottom portion and both portions are substantially cylindrical such that either an inverted frusto-conical drink container, a drink can or a drink can with an insulating sleeve around it can be set into the receptacle.

The related art described above discloses holder and support devices used for various purposes. Of importance; Bentley, U.S. Pat. No. 6,808,394, discloses a system for demonstrating the effects of a polarized lens on reducing glare. However, the prior art fails to disclose a counter demonstrator that adjusts to the height of a customer so as to demonstrate the improved visibility of polarized lenses. The present disclosure distinguishes this and other benefits over the prior art providing heretofore unknown advantages as described in the following summary.

BRIEF SUMMARY OF THE INVENTION

This disclosure teaches certain benefits in construction and use which give rise to the objectives described below.

An important application for the present invention is in demonstrating the elimination of glare using Polaroid™ sunglasses or other instrument having polarized lenses or other glare reducing lens. Such a demonstration has been found to spur commercial sales of such sunglasses. This effect is demonstrated on the surface of a demonstration plate where a viewer (potential buyer), positioned opposite the plate, sees a first graphic image which is located behind the plate so that it is viewed through the plate, i.e., direct viewing. The viewer also sees a second graphic image superimposed on the surface of the plate. The second graphic image is positioned such that the viewer sees a mirror image on the plate. In order to enable the viewer to see both the first graphic image through the plate as well as the second graphic image as a reflection on the plate, the front surface of the plate is constructed as a half-mirror, i.e., a surface reflecting a portion of incident light as well as transmitting a portion of incident light. In order for the viewer is able to see the two images superimposed the image sources are positioned at a fixed angle relative to each other. The holder is able to be manually positioned on the base over a range of angles appropriate for displaying the superimposed images to both shorter and taller viewers. The two superimposed images are an example of how glare can interfere with clear vision when viewing an object. The mirror reflected image represents glare on the directly viewed image. After viewing the demonstration plate without the benefit of Polaroid™ sunglasses, the viewer views the same display as seen through Polaroid™ sunglasses. With the glasses, the mirror reflected image disappears leaving an unobstructed image of the directly viewed image. The relative positions of the plate and the second graphic image and the mechanism for adjusting the viewing angle for viewers of different heights are important aspects of the present apparatus.

A primary objective inherent in the above described apparatus and method of use is to provide advantages not taught by the prior art.

Another objective is enable the demonstration of the elimination of glare through the use of polarized or other glare reducing lenses.

A further objective is to provide a device that is able to effectively demonstrate the benefit of glare reduction lenses.

A still further objective is to provide such a device that is adjustable so as to enable effective demonstration to viewers of different heights.

A still further objective is to provide such a device that is able to be fixed at selected angles appropriate for such demonstrations.

A still further objective is to provide such a device that is able to easily receive and exchange graphic images of selected scenes.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

FIGS. 2-7 are side elevational views thereof demonstrating various means for the adjustment and fixing of viewing angle.

DETAILED DESCRIPTION OF THE INVENTION

Figure 1:
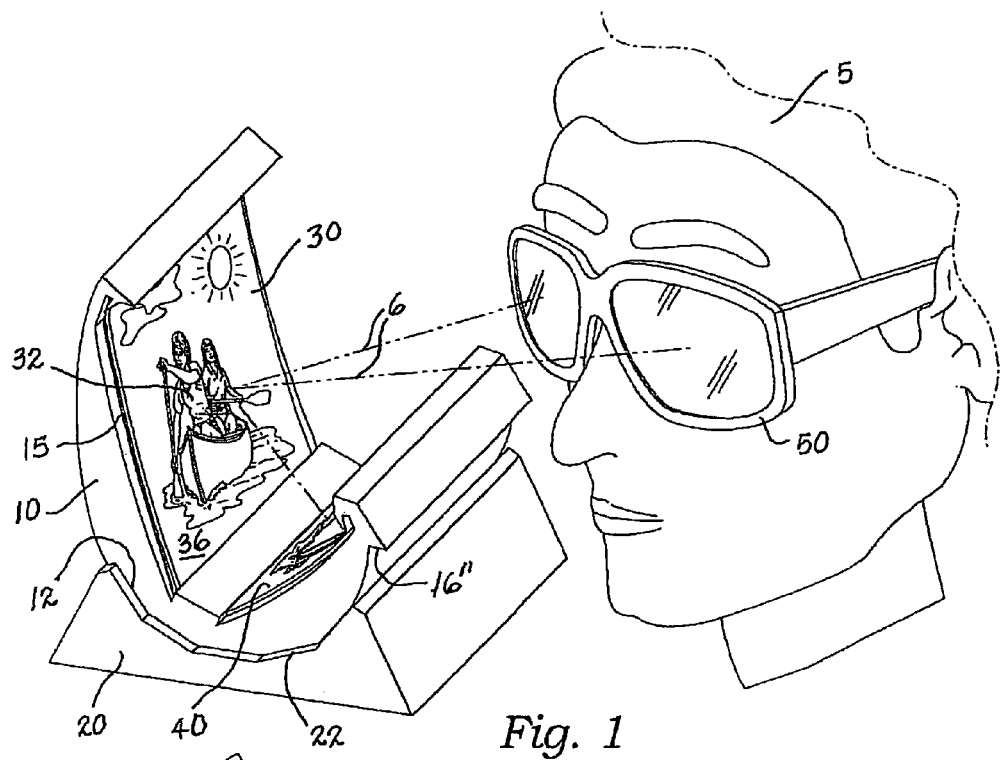
FIG. 1 is a perspective view of the presently described apparatus as viewed by a person.

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Described now in detail is an apparatus for demonstrating the effect of reducing glare using polarized lenses or other glare reducing filter. In this description, and the claims to follow, we use the example of polarized lenses and the polarizing effect as applied to glare reduction, but in all instances in this writing, "polarized lenses," shall mean as well, any other type of glare reducing filter, as is known in the fields of optics and visual arts. In this sense, it should not be assumed that polarized lenses must a component of the present invention. The apparatus has a holder 10 which rests, or is otherwise engaged with a base 20, the base 20 being supported by any generally horizontal surface so that the holder 10 is oriented in a preferred upright position as shown in the figures. A half-mirrored plate 30 preferably of a non-metallic material is mounted on the holder 10, and a first graphic image 15 is mounted behind the plate 30. A second graphic image 40 is also mounted on the holder 30 in a position angularly opposing the mirrored plate 30 as best seen in FIGS. 2-7. The angular relationship between plate 30 and image 40 is such that a viewer 5, positioned opposite the plate 30, generally doesn't see the image 40 directly, but a reflection of the image 40 is visible to the viewer on plate 30. Images 15 and 40 may be mounted on card stock, paper, or plastic materials; and they may be permanently formed on plate 30 and base 20, and they may be interchanged with other images.

The holder 10 is adapted for movement on, and in contact with, the base 20 over a range of positions as shown by phantom images in FIGS. 4-6. This motion allows the positioning of plate 30 at an angle relative to a viewer, wherein the viewer can see the plate 30 but not the image 40 and, further, this motion is helpful for adjusting the angle of viewing appropriate for both short and tall individuals. It is noted that without this ability to position plate 30, the viewer may not see the reflection of image 40 superimposed on image 30.

Preferably, graphic image 15 is visible through plate 30. In this discussion and in the claims appended hereto, the use of "first image 15" and "second image 40," shall take the meaning of either a separate card stock having a graphic image printed, or otherwise placed on its surface, or a photograph, or a layer printed or otherwise placed directly onto a back surface 34 of plate 30, or on base 10. In the preferred embodiment, first image 15 is a separate graphic card that may be replaced by an alternate graphic card having a different image. The use of the word "image" shall refer herein to the pictorial image 32, as well as to a card or other substrate that carries the image 32.

Mirrored plate 30 is a front surface reflector, that is, the front surface 36 is reflective, however, the reflective coating on the front surface 36 is only a partial reflector (half-mirror) allowing some light to pass through. Light falling on front surface 36 is partially reflected and partially transmitted. The reflected portion allows the viewer to see the reflection of image 40, while the transmitted portion illuminates graphic image 15 and is then reflected back through the plate 30 to the viewer so that the viewer also sees the image 15. The result is that the viewer, observing plate 30, sees images 15 and 40 superimposed. Plate 30 may be of glass or of a plastic sheet material and in the preferred embodiment, plate 30 is of a flexible material such as polycarbonate or other plastic. In the figures we see that in the preferred embodiment the plate 30 and images 15 and 40 are mounted on cards bent at one or both opposing edges to fit into slots in holder 10 so that they are secured therein.

In one embodiment, a pair of horizontally polarized lenses (glasses 50) are used by the viewer 5, so that only the image 15 is visible but the image 40 is not. This is because the reflected image 40 is horizontally polarized by the process of reflection and therefore is not transmitted through horizontally polarized lenses which act as a filter for horizontally polarized incident light. On the other hand, the graphic 15 is not comprised of reflected light so that it is not horizontally polarized and passes through the lenses of the glasses 50 without being diminished or filtered out. This demonstration of polarized glasses 50 is quite dramatic in that without the glasses, the image 40 effectively blocks or confuses the image of the image 15, but with the glasses 50, the image 15 is clear and the image 40 is rendered invisible. It should be understood that glasses 50 represent, as well, polarized filters for cameras, polarized filters for optical instruments, lorgnette 60 shown in FIG. 3, and similar optical filters and elements. Clearly, other optical filters beside Polarized lenses may be used to produce similar results.

Figure 3:
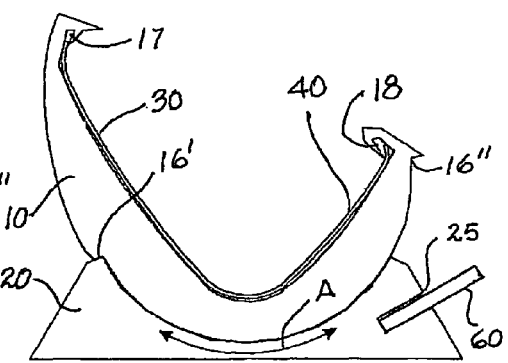

As shown in FIG. 3, plate 30, image 15 and image 40 may be part of a common element, i.e., they may be contiguous as an elongated card or similar arrangement. The advantage to having both images on the same element is that it is easier to make the images superimpose in a desired manner.

A lens or longnette 60 may be stored in a slot 25 of the base 20 for easy access in demonstrating the glare reducing effect as is shown in FIG. 3.

In order for the viewer 5 to position plate 30 for seeing both the direct and the reflected images, holder 10 is manually adjusted. Importantly, the holder 10 is able to be moved so that plate 30 assumes a desirable angle relative to the line of sight 6 of the viewer 5. To accomplish this, the base 20 provides a concave surface 22 which lies in contact with a convex surface 12 of the holder 10.

Figure 2:
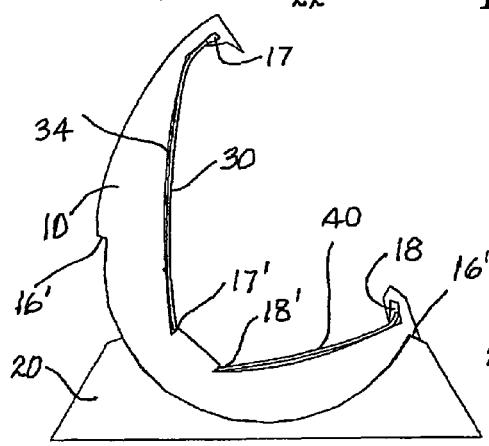

In one embodiment of the present invention, the concave 22 and convex 12 surfaces are segmented into laterally directed planar portions as shown in FIGS. 1-3. In this case, when the segmented portions of the surfaces 12 and 22 are in abutting coincidence, the holder 10 tends to maintain its position on base 20 thereby maintaining plate 30 at a desired attitude. Since there are a number of segments, the holder 10 may be placed in several distinct attitudes as demonstrated in FIGS. 2 and 3.

In alternate embodiments shown in FIGS. 4 and 6, one of the concave and convex surfaces 22, 12, provides a laterally directed rib 24 and the other of the concave and convex surfaces 22, 12 provides a plurality of side-by-side laterally directed linear grooves 14, each of the grooves 14 positionable for receiving the rib 24 thereby setting the holder at one of the selected angles. The rib 24 may be curvilinear as shown in FIG. 4, or saw-toothed as shown in FIG. 6. FIG. 7 shows a square edged embodiment of both the rib 24 and the grooves 14. Such a mechanical engagement is beneficial in securing the orientation of plate 30.

Preferably, the convex surface 12 provides opposing position stops 16' and 16", as shown in FIG. 5, the position stops being located for limiting the range of motion of the holder 10 on base 20. Stops 16' and 16" are preferably laterally directed shoulders as shown. The arrows "A" shown in FIGS. 3-7 and 9 to show that the direction of movement of the holder 10 is in a vertical plane thereby positioning plate 30 at angles relative to the viewer 5.

Figure 8:
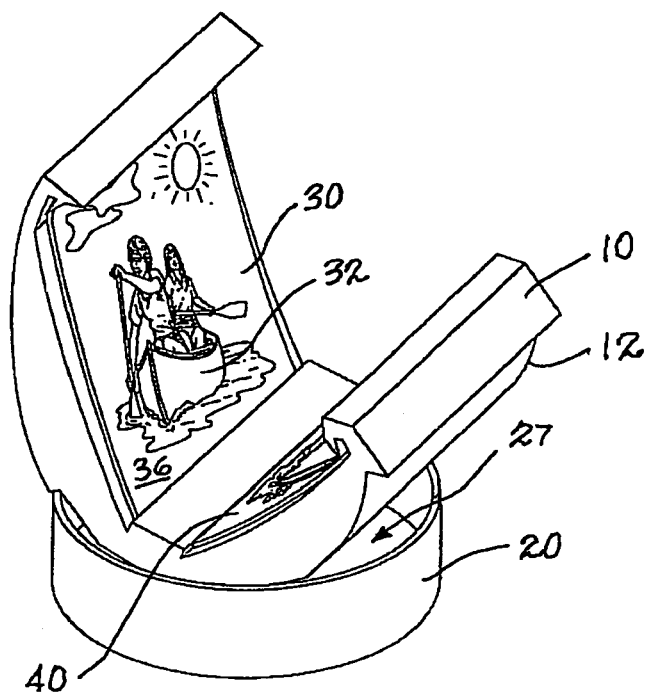
FIGS. 8 and 9 are perspective views of an alternate embodiment thereof with means for adjusting viewing angle as well as viewing direction.
Figure 9:
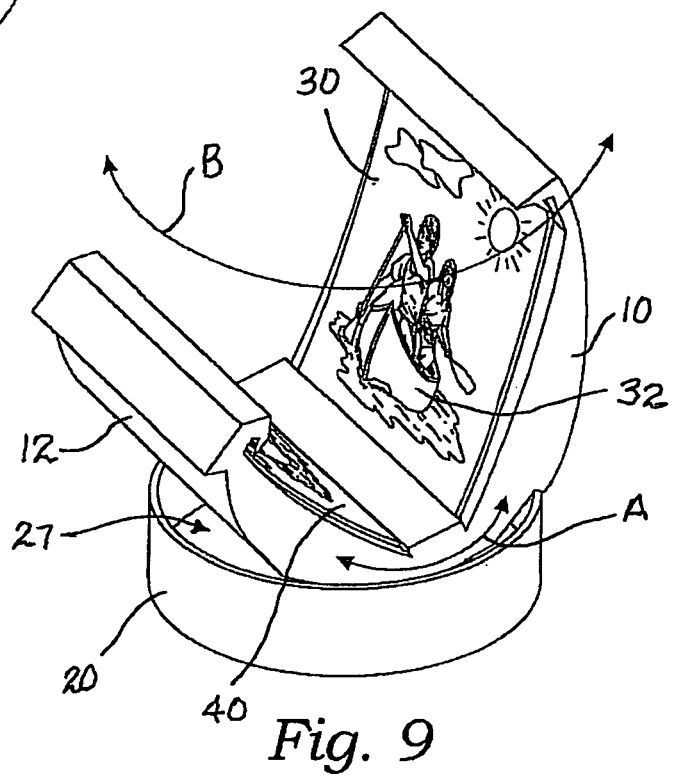

FIGS. 8 and 9 define an alternate embodiment wherein the base 20 is circular in conformation, enclosing a central open space 27. This is in contrast with the holder shown in FIG. 1 which type is also represented in FIGS. 2-7. The holder 10, as shown in FIGS. 8 and 9 respectively provides a convex surface 12 which lies in contact with the circular base 20 whereby the holder 10 is enabled for vertical rotation as depicted by arrow "A" as well as horizontal rotation as depicted by arrow "B." Rotation in the horizontal plane enables the demonstrator to be positioned quickly from one person to another when the persons are positioned laterally with respect to the demonstrator.

Preferably, the holder 10 provides a first pair of opposing slots 17 and 17' positioned for receiving the plate 30 and the first graphic image 15, and a second pair of opposing slots 18 and 18' for receiving the second graphic image 40. Preferably the slots 17, 17', 18, and 18' are sized and positioned for compressively gripping the plate 30 and images 15 and 40 so that they cannot slip out of holder 10.

The present invention also defines a method of demonstrating the glare reduction effect, the method including: securing the half-mirrored plate 30 in the holder 10, resting the holder 10 on base 20; securing a first image 15, in the holder 10 in a position on or behind plate 30 and angularly positioning second image 40 in a position opposing plate 30; adapting the holder 10 for movement on the base 20 over a range of positions placing the plate 30 at selected angles relative to a line of sight 6; and positioning plate 30 so that the graphic image 15 is visible from a front surface 36 of plate 30; and positioning the second image 40 so that it produces a reflection on the front surface 36 of plate 30 thereby superimposing the images 15 and 40 as seen by a viewer 5 in front of the apparatus. The holder movement on the base is achieved by the step of moving the convex surface 12 of the holder 10 in contact with the convex surface 22 of the base 20. The holder 10 is held at a selected one of the angles by the step of engaging laterally segmented planar portions of the surfaces 12 and 22. Alternatively, the holder 10 is held at a selected one of the angles by the step of engaging a laterally directed rib 24 with one of a plurality of side-by-side laterally directed linear grooves 14. Of course, the rib 24 may be in either the holder 10 or the base 20 with the grooves 14 being formed in the opposing surface. Finally, the holder 10 may be positioned for selective viewing of the graphical image by rotating the holder 10 on the base in both vertical and a horizontal planes.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A demonstrator apparatus comprising: a holder resting on a base; a half-mirrored plate mounted on the holder; a first graphic image mounted behind the plate; and a second graphic image mounted on the holder in a position angularly opposing the plate wherein a line of sight to the plate enables viewing the first graphic image directly as well as a mirror image of the second graphic image; the holder adapted for movement on the base over a range of positions for placing the line of sight appropriate to both short and tall viewers, whereby viewing the plate through a glare reducing lens eliminates the mirror image of the second graphic image.

2. The apparatus of claim 1 further comprising a glare reducing lens, wherein the lens is one of a polarizing lens and a light filter lens.

3. The apparatus of claim 1 wherein the graphic images are part of a unitary and common element.

4. The apparatus of claim 2 wherein the base provides a means for storing the lens.

5. The apparatus of claim 1 wherein the base provides a concave surface in contact with a convex surface of the holder.

6. The apparatus of claim 5 wherein the concave and convex surfaces are segmented into laterally directed planar portions.

7. The apparatus of claim 5 wherein one of the concave and convex surfaces provides a laterally directed rib and the other of the concave and convex surfaces provides a plurality of side-by-side laterally directed linear grooves, each of the grooves positionable for receiving the rib thereby setting the holder at one of the positions.

8. The apparatus of claim 7 wherein the rib is one of curvilinear, saw-toothed or square edged and the grooves are correspondingly shaped.

9. The apparatus of claim 5 wherein the convex surface of the holder provides opposing position stops, the position stops placed for limiting the range of said positions.

10. The apparatus of claim 1 wherein the base provides a circular wall, the convex surface of the holder positioned at rest on the circular wall thereby enabling setting of the holder over the range of positions and further enabling the holder to move over a range of horizontal positions.

11. The apparatus of claim 1 wherein the holder provides a first pair of opposing slots positioned for receiving the plate and the first graphic image, and a second pair of opposing slots for receiving the second graphic image.

12. A method of demonstrating glare reducing lenses comprising the steps of: securing a half-mirrored plate in a holder resting on a base; securing a first graphic image behind the plate; securing a second graphic image in the holder in a position angularly opposing the plate; adapting the holder for movement on the base over a range of positions wherein a visual line of sight of both tall and short individuals is able to see the first graphic image through the plate as well as a superimposed mirror image on the plate of the second graphic image.

13. The method of claim 12 wherein the holder movement on the base is achieved by the step of moving a convex surface of the holder in contact with a convex surface of the base.

14. The method of claim 13 wherein the holder is secured at selected positions on the base by the step of engaging mutual flat surfaces.

15. The method of claim 13 wherein the holder is secured at selected positions on the base by the step of engaging a laterally directed rib with one of a plurality of side-by-side laterally directed linear grooves.

16. The method of claim 12 wherein the holder is positioned for selective viewing of the plate by the step of vertical and horizontal rotation on the base.

17. The method of claim 12 wherein the plate and the graphic images are engaged with the holder by the step of sliding the plate and the graphic images into opposing slots in the holder.

* * * * *